United States Patent
Kinney et al.

[11] Patent Number: 5,808,662
[45] Date of Patent: Sep. 15, 1998

[54] SYNCHRONIZED, INTERACTIVE PLAYBACK OF DIGITAL MOVIES ACROSS A NETWORK

[75] Inventors: Daniel Reid Kinney, Mountain View; Eric James Graves, Sunnyvale; Roger Allen Powell, Half Moon Bay, all of Calif.

[73] Assignee: Silicon Graphics, Inc., Mountain View, Calif.

[21] Appl. No.: 554,379

[22] Filed: Nov. 8, 1995

[51] Int. Cl.⁶ .............................. H04N 5/76; H04N 7/14
[52] U.S. Cl. ................................ 348/15; 348/13; 386/68
[58] Field of Search .................... 348/7, 12, 13, 348/15, 10; 358/335, 311; 360/13, 14.1, 14.2, 14.3; 434/273; 386/4, 6, 7, 8, 35, 52, 56, 66, 68; 379/96, 97, 101; H04N 7/14, 5/76

[56] References Cited

U.S. PATENT DOCUMENTS

| | | | |
|---|---|---|---|
| 4,785,472 | 11/1988 | Shapiro | 379/96 |
| 4,829,372 | 5/1989 | McCalley | 348/12 |
| 5,119,188 | 6/1992 | McCalley et al. | 348/12 |
| 5,206,721 | 4/1993 | Ashida et al. | 348/15 |
| 5,357,276 | 10/1994 | Banker et al. | 348/7 |
| 5,365,264 | 11/1994 | Inoue et al. | 348/10 |
| 5,365,579 | 11/1994 | Hendrickson | 379/101 |
| 5,537,141 | 7/1996 | Harper et al. | 348/12 |
| 5,546,324 | 8/1996 | Palmer et al. | 348/15 |

OTHER PUBLICATIONS

Corel Video sales pamphlet, 1995.
Printouts of Sprint Drums Homepage (www.sprint.com/drums), 1996.
David Bennahum, "Drumming Up a Movie," *Wired*, Aug. 1994, p. 32.

*Primary Examiner*—Tommy P. Chin
*Assistant Examiner*—Luanne P. Din
*Attorney, Agent, or Firm*—Sterne, Kessler, Goldstein & Fox P.L.L.C.

[57] ABSTRACT

A system and method for synchronized playback and control of a movie (also referred to as time-based digital media). The movie includes one or more data structures, called "tracks", containing time-based data that is intended to be played together in a synchronized manner at a given rate of speed. The system and method allows two or more participants that are operating on different playback systems at different locations to simultaneously view and control the playing of the movie. The image on each participants display is kept synchronized with the others, providing a virtual co-location.

39 Claims, 6 Drawing Sheets

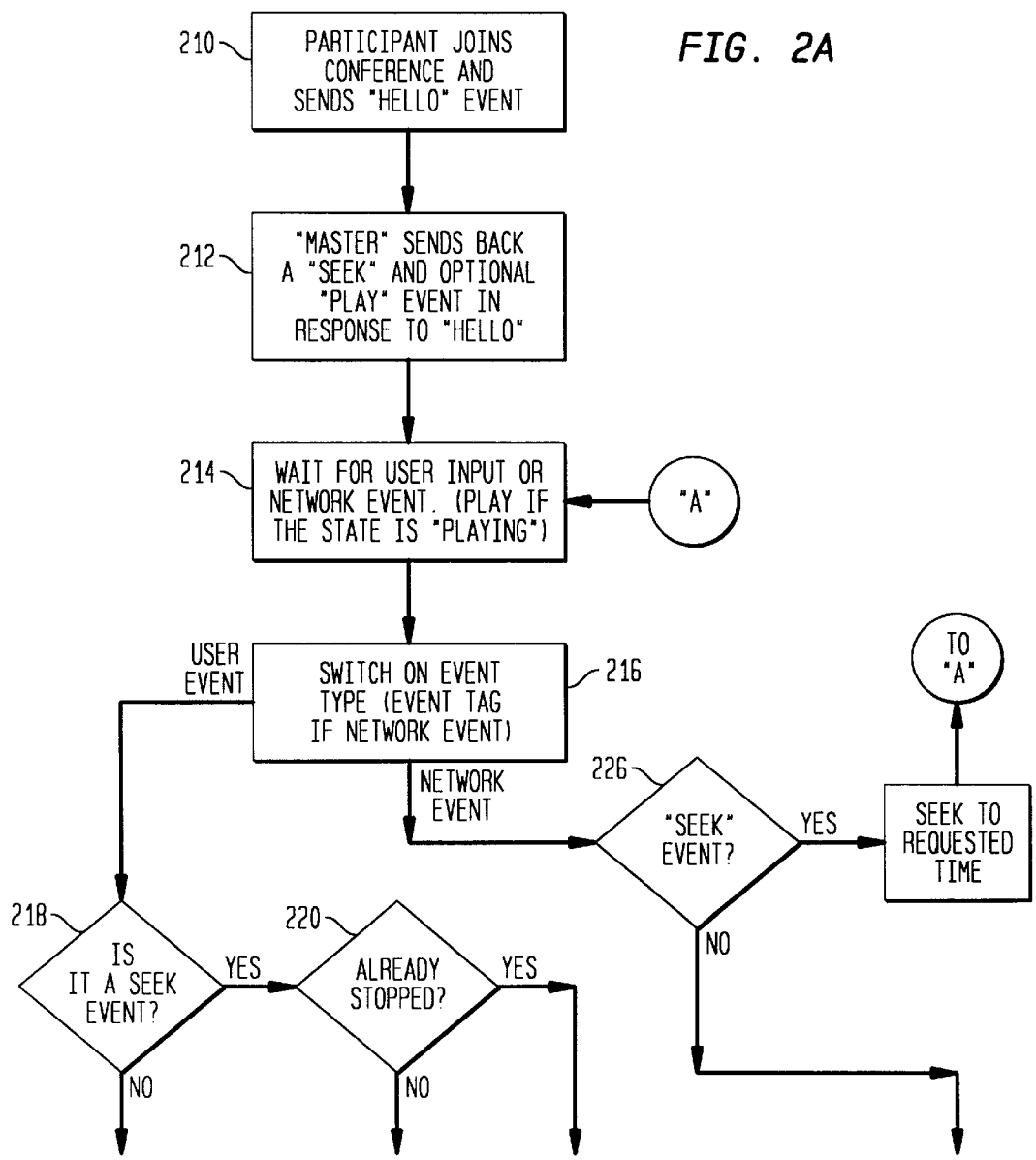

SYNCHRONIZED, INTERACTIVE PLAYBACK OF DIGITAL MOVIES ACROSS A NETWORK

BACKGROUND OF THE INVENTION

1. Field of the Invention

The present invention relates to computer-based methods and apparatus for interactively processing digital movies and, in particular, to technology for supporting such interactive processing in a synchronized, collaborative manner among multiple participants across a wide-area network.

2. Related Art

Editing or post-production of a movie (or other time-based media) in real-time is a collaborative effort between multiple parties. Typically, each member of the party would gather around a VCR and monitor and view or edit the movie. Editing would naturally include the playing of the movie, including fast forwarding, slow forwarding, reversing, etc. Oftentimes, however, not all parties are available at the same time, nor can meet at the same location. Many companies require their best creative minds available for the review, no matter what their location.

One solution is to allow each participant in the editing or post-production process to view the movie from remote locations. Each participant would have a copy of the video tape having stored thereon a movie and a system for viewing the movie. The participants can then commence a teleconference call, and begin playing the tape at roughly the same time. This approach, however, has significant drawbacks. Starting and stopping the movie in a synchronized fashion or viewing a specified frame of the movie is almost impossible. Each participant must waste time while they scramble to get their own version of the movie to the specified frame. Of course, in any realistic collaborative session, this troubling phenomenon will repeat itself again and again.

Moreover, the editing or post-production process becomes unwieldy if a participant decides to reverse play or to fast forward within the tape to another frame in the movie for discussion. Trying to coordinate all participants to reset their own video tapes to the same, new location will typically result in mass confusion and extensive delays, which inherently destroys the creative process.

A second alternative is to broadcast digital copies of the movie from a central server located at a remote location to each participant simultaneously. The server would be responsive to interactive requests from any one of the users, and it would adjust its playback of the movie based on requests for reverse or fast forward play, etc. Unfortunately, this approach is not feasible from a practical standpoint. Commonly available communication infrastructures, such as telephone networks and the Internet, do not currently offer nearly enough data bandwidth to support viewing movies at high-resolution in the manner proposed.

What is needed is a system and method that supports collaborative, interactive viewing of movies at good quality resolution by multiple participants in remote locations, and that works within the realistic bandwidth limitations of current technologies. Such a system should relieve participants of the need to manually synchronize the viewing of movies, and should at the same time support flexible, convenient, interactive control of movie playback by any of the different participants. In addition, the system should preferably apply the power and flexibility of digital computing to further enhance the collaborative nature of such sessions, such as by permitting participants to conveniently view each other's notes or annotations.

SUMMARY OF THE INVENTION

The present invention provides a system and method for allowing a plurality of physically remote participants to view a movie or other time-based digital media in an interactive and collaborative manner. The movie includes one or more data structures, called "tracks", containing time-based data that is intended to be played together in a synchronized manner at a given rate of speed. Each participant interacts with a computer-controlled playback system. The computer-controlled playback systems are interconnected by a communication channel.

The present invention initially transfers movie data to each one of the computer-controlled playback systems. Next, one of the participants interactively requests a playback function selected from a group including at least the following functions: play, stop and seek. Playback control data corresponding to the selected playback function is then transferred over the communication channel to each of the computer-controlled playback systems. Finally, the movie data is played in a synchronized manner at each of the playback systems in accordance with the playback control data. The present invention further allows the power and flexibility of digital computing to further enhance the collaborative nature of such sessions, by permitting participants to conveniently view each other's notes, annotations or to directly communicate with one another via video imaging.

The present invention allows participants to improve productivity, specifically in areas which require large amounts of interactive review of a movie. Furthermore, the present invention requires minimal bandwidth over the communication channel, thereby allowing the present invention to work within the realistic bandwidth limitations of current technologies. Still further, the present invention relieves participants of the need to manually synchronize the viewing of movies.

BRIEF DESCRIPTION OF THE DRAWINGS

The foregoing and other features and advantages of the invention will be apparent from the following, more particular description of a preferred embodiment of the invention, as illustrated in the accompanying drawings.

FIGS. 2 2A, 2B and 2C are flowcharts illustrating operational flow of the image processing network in accordance with the present invention.

The preferred embodiment of the invention is now described with reference to the figures where like reference numbers indicate like elements. Also in the figures, the left most digits of each reference number corresponds to the figure in which the reference number is first used.

DETAILED DESCRIPTION OF THE PREFERRED EMBODIMENTS

The present invention provides a system and method for synchronized playback and control of a movie (also referred to as time-based digital media). The term "movie" is used herein to mean a collection of one or more data structures, called "tracks", containing time-based data that is intended to be played together in a synchronized manner at a given rate of speed. Track types may be, but are not limited to, an image track, audio track, or MIDI track. The data in a track may be stored in different formats including compressed or uncompressed forms. An image track, for example, includes a plurality of frames, as is well known in the art. A system and method is described that allows two or more participants at separate locations to simultaneously view and control the playing of the movie. The image on each participants display is synchronized with the others, providing a virtual co-location. Accordingly, the highest possible playback quality is achievable at each location.

Figure 1:
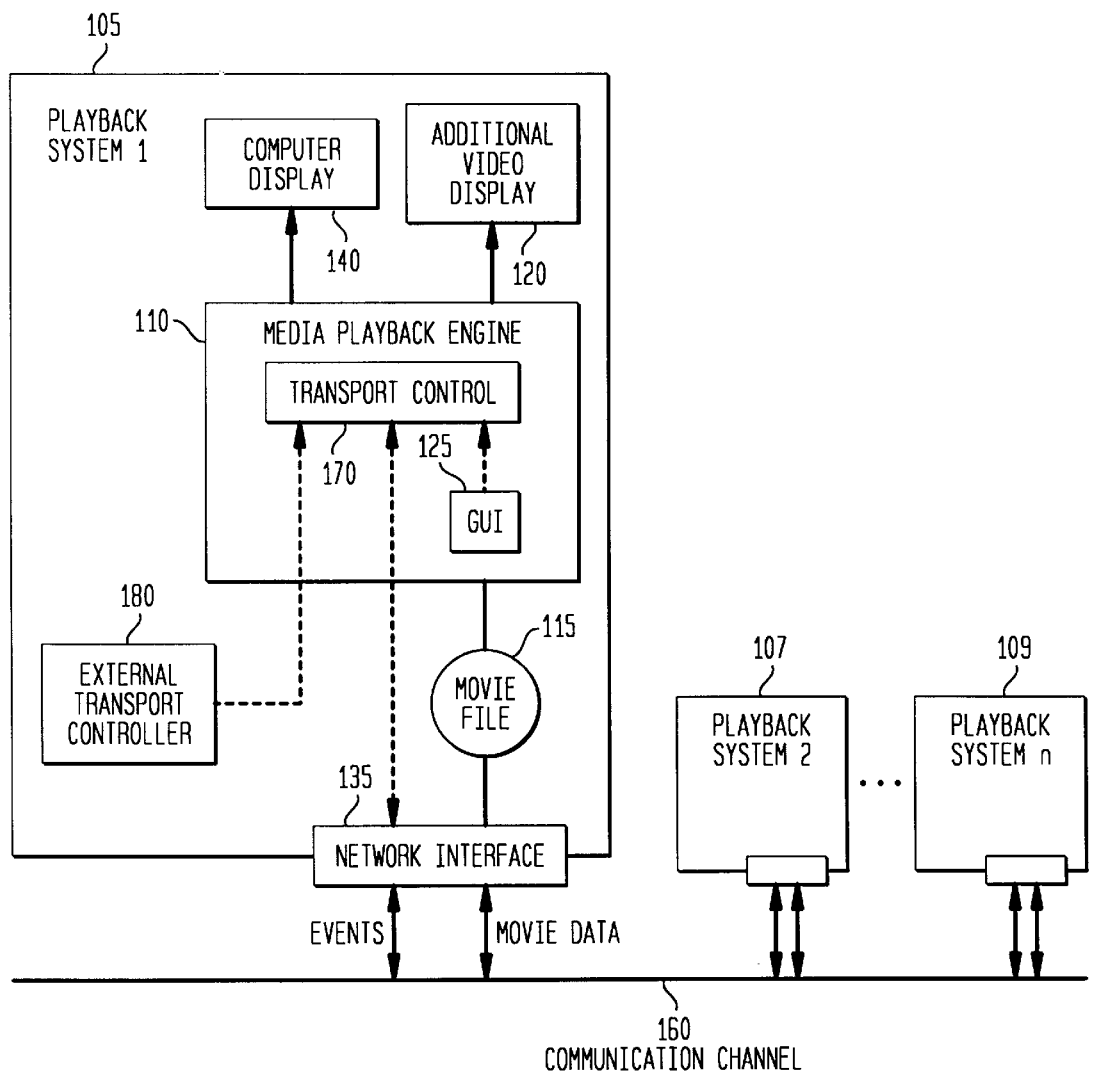
FIG. 1 is a high-level block diagram that illustrates an image processing network in which the present invention operates.

FIG. 1 illustrates an image processing network 100. The network 100 includes a plurality of computer-implemented playback systems 105, 107 and 109 and a communication channel 160. Communication channel 160 can take many forms, including a conventional telephone line with modem, a local area network (LAN) or wide area network. Network interface 135 allows playback system 105 to transfer/receive data to/from playback systems 107 and 109, as is well known in the art. The essential features of playback system 105 include a media playback engine 110, a media (or movie) file 115, network interface 135 and a monitor 140.

The present invention requires a relatively small amount of bandwidth in order to operate properly, allowing it to work in conjunction with other services making use of the network such as electronic mail or a video conferencing system. In a preferred embodiment, communication channel 160 is a Transport Control Protocol/Internet Protocol (TCP/IP) or ISDN communication channel, or any other communication channel that can transfer the data structures described herein. Three remote playback systems 105, 107 and 109 are shown connected to communication channel 160. However, this is for illustration purposes only. The present invention does not have any restraints with regard to the number of remote playback systems that can be connected to communication channel 160.

Media file 115 is a storage device that contains enough memory to store a movie. In an alternate embodiment of the present invention, only a portion of a movie (e.g., a finite number of tracks, which is less than the entire movie) is stored on media file 115. The term "movie data" is used herein to refer to the data stored within media file 115 regardless of whether the entire movie or only a portion of the movie is stored. Media file 115 may take many forms including, but not limited to, CD ROM, a floppy disk, a hard disk, an optical disk, a read only memory (ROM), a random access memory (RAM), or a direct access storage device (DASD). Movie data is transferred to the media files prior to the viewing by the participants. The movie data can be downloaded to the media file 115 via the communication channel 160. Alternatively, the movie data can be distributed to the remote locations via a floppy disk, CD ROM, etc. The present invention is not limited, however, to only these two methods of transferring the movie data to media file 115.

Media playback engine 110 includes a central processing unit (not shown), a video player (e.g., a VCR) (not shown), and transport control logic 170. In a preferred embodiment, media playback engine 110 is part of an Indy™ Workstation, produced by Silicon Graphics, Inc., Mountain View, Calif.

Each workstation may be equipped with a Cosmo Compress™ option board. Cosmo Compress allows the media playback engine 110 to compress and decompress the movies in a fast, efficient manner. If Cosmo Compress is not installed, compression and decompression is performed in software. The Indy workstation is connected to monitor 140. A graphical user interface (GUI) 125 can be displayed within monitor 140. GUI 125 provides icons and buttons that allow participants to control the viewing of a movie.

An additional interlaced video display 120 can also be connected to media playback engine 110 through a standard video output. This allows movie data that is intended to be displayed on such monitors (e.g., a television set) to be examined for differences from the computer display which is not interlaced. The playback system 105 may further include an optional external transport controller 180 (e.g., a jog-shuttle). Controller 170 allows a participant to control the viewing of the movie or to annotate the movie, as described in greater detail below.

The Indy workstation is illustrative only, and the present invention contemplates other workstations and computer systems. In fact, the present invention contemplates that two or more participants will be viewing a movie on different workstations or systems. Each workstation or system may be operating under control of a clock having different clock rates. Accordingly, each participant views a movie in a "virtual co-location." That is, it appears to a user as if all participants are viewing the movie at exactly the same rate. However, because of the different clock rates, the movie at each location may be out of synch by a few frames relative to other locations (i.e, playback systems). As described below, the present invention compensates for this inaccuracy so as to not disrupt the creative process.

Note that the present invention is not dependent on the specific type of operating system utilized, nor must the operating system of each participants' machine be the same. Communication between playback engines is accomplished with a number of data structures described within this document that are independent of the participants' operating systems. The present invention makes use of the TCP/IP protocol for the delivery of these data structures. The operating system used in a preferred embodiment is Unix ™.

Transport control logic 170 allows a participant to control the actions of a movie. Specific actions that the participant can initiate are, for example, normal playback, stop, fast and slow reverse, fast and slow forward, and seek. Some of these actions will be described below. However, the present invention contemplates any action a participant can take in viewing and editing a movie, as would be apparent to a person skilled in the relevant art. In a preferred embodiment, participants trigger these actions via GUI 125.

Normal playback of a movie means displaying the movie at the intended frame rate. Reverse play means displaying the frame sequence in reverse order. Pause or step means temporarily interrupting the sequence at a current frame, and displaying only that single, current frame for the duration of the interruption. Fast forward play means displaying the movie in the original sequence, but at a speed greater than the originally intended frame rate. Fast reverse play means displaying the movie in the reverse sequence, and at a speed greater than the originally intended frame rate. Slow motion reverse (or forward) play means displaying the movie in reverse (or original) order, and at a speed slower than the original intended frame rate. Seek allows a participant to advance to a specific frame within the movie.

Figure 3:
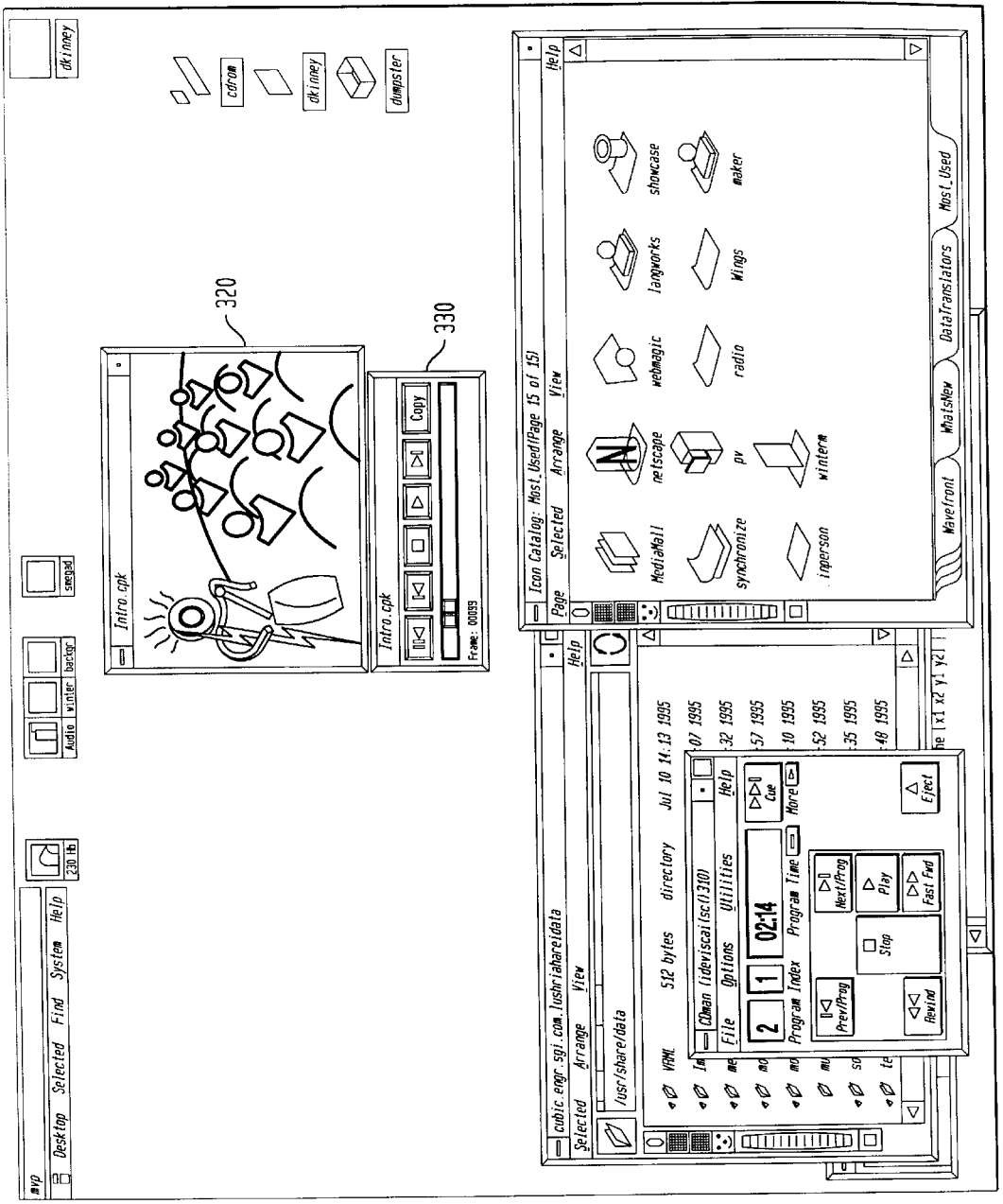
FIG. 3 illustrates a screen of a workstation having displayed therein a graphical user interface used by the present invention.

FIG. 3 illustrates a screen 310 of a workstation. Multiple windows are displayed, some of which display multiple icons. Also displayed is GUI 125 used in a preferred embodiment. GUI 125 includes a window 320 and a control panel 330. Window 320 has displayed therein a movie that can be viewed and controlled by a participant on one side of communication channel.

Figure 4:
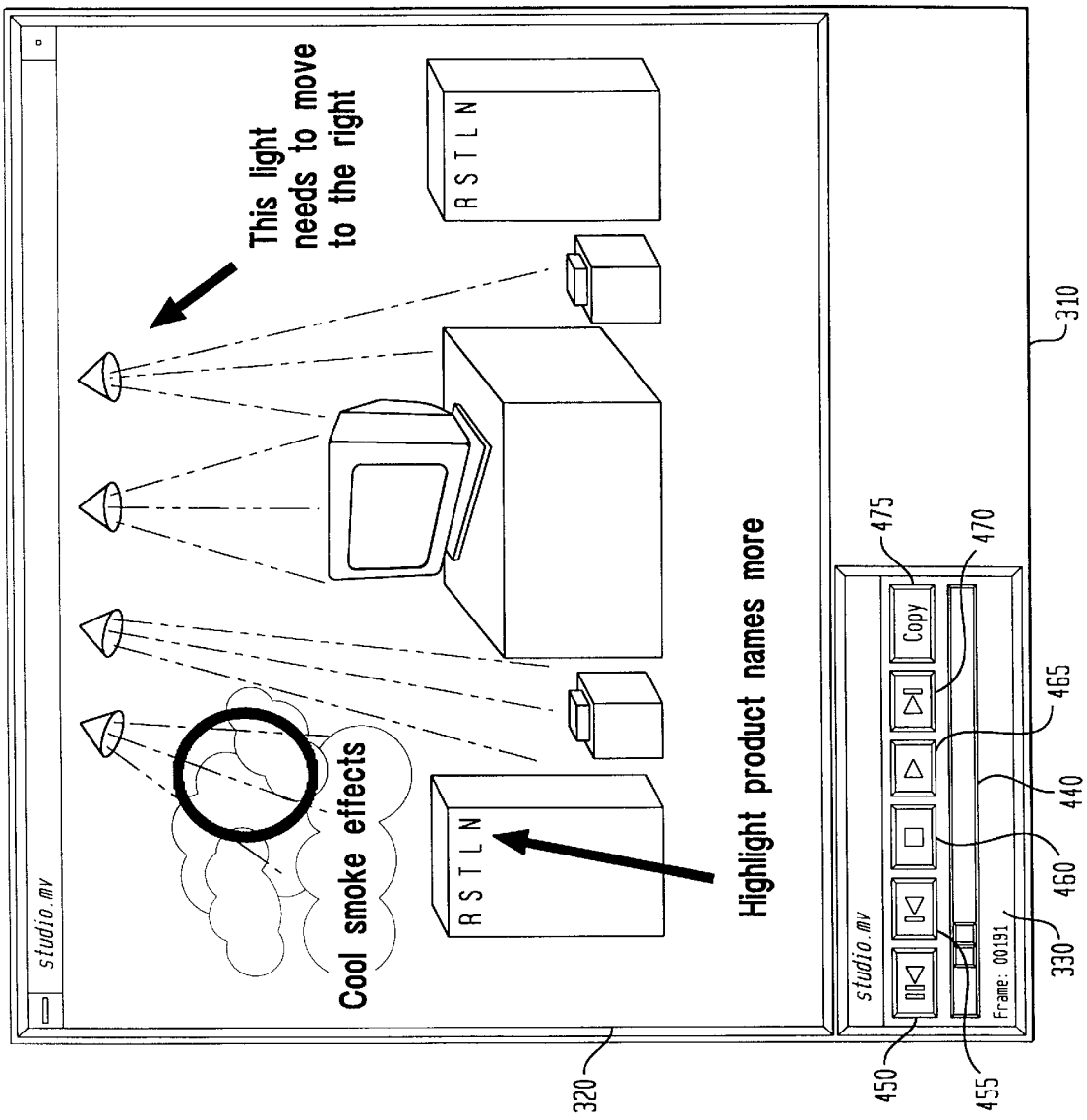
FIG. 4 illustrates the graphical user interface used in a preferred embodiment of the present invention to control playback of a movie.

FIG. 4 illustrates a larger view of the graphical user interface used in a preferred embodiment of the present invention to control playback of the movie displayed within window 320. Control panel 330 includes a plurality of playback buttons. A frame control button 440 is used to quickly advance to a particular frame within the movie. Frame control button 440 takes the form of a sliding button. A participant activates frame control button 440, as well as the other buttons, with the use of a keyboard, mouse or similar pointing device. This type of point and click technology is well known in the art. An alternate embodiment contemplates using an external jog-shuttle (shown in FIG. 1 as reference number 170) to control the speed and direction of the playback. Speed and direction could also be controlled graphically using sliding buttons or the like. Note that these embodiments are only illustrative, and other embodiments for controlling speed and direction are contemplated by the present invention.

Control panel 330 further includes a reset button 450, a frame back (reverse) button 455, a stop button 460, a play button 465 and a frame forward button 470. A volume button (not shown) can also be provided. The volume button can take the form of a sliding button similar to frame control button 440. Furthermore, a copy button 475 is provided to allow a participant to copy data from the player to other tools on the host system for further data processing. This type of data transfer is well known in the art. Examples include copying frames from an image track into a shared whiteboard (a common part of a video conferencing package) or image processing application, copying audio data into a sound processing application, or data from any track into a media composition application. The image track and audio track can then be annotated by the participants.

Communication between participants takes place by the transfer of a number of data structures, or "events", that are transferred over network 160. Events are also referred to as playback functions. The function of transferring events is performed by transport control logic 170. Each data structure contains at least an event identification, sequence number and event specific data. The identification is a unique tag that denotes the action that is to take place. The sequence number allows each event to be processed by each participant in the same order that the action was specified. Each data structure contains a data field that is associated with a user defined action that is applied by playback engine 110. The data field indicates a particular action the participant activates along with relevant information that is used to perform the action. These actions include: play, stop and seek.

The first data structure is the "Play" event which indicates that playback engines 110, 120 should begin to play the movie. The phrase "play the movie" indicates that the image track is advanced either in the forward or reverse direction. The data field specifies a floating point value that indicates the rate at which the playback should be scaled relative to the rate specified in the movie file itself. For example, if the movie specifies that the image track should be played at a rate of 30 frames per second, a value of 1.0 in the play event data structure specifies that this should be the playback rate. If the value is 0.5, then the playback rate for the image track should be 15 frames per second. Negative values indicate that the playback should occur in the reverse direction.

A second data structure called "stop event" includes a tag that indicates that a participant wants to stop the playing of a movie.

A third data structure called "seek event" includes a tag that indicates that a participant wants to advance to a specific frame within the movie. Seek event further includes a time and a timescale. Time equals the number of frames the participant wants to advance into the movie. Timescale equals the frame rate (e.g., 24 frames per second (fps)). Time divided by timescale represents the number of seconds from the start of a movie the participant want to advance into the movie.

A fourth data structure called a "Hello" event indicates that a new participant is joining the shared playback session. In response to this event, the participant receives events (e.g., seek and play) needed to synchronize the new participant with the other participants in the session. This event allows participants to join the session asynchronously. A fifth data structure called a "Goodbye" event indicates that the participant is leaving the shared playback session. It specifies that the participant does not need to receive future events for the specific playback session.

As previously mentioned, data from the movie can be transferred into a tool that is suited for annotation of that data such as a shared whiteboard. This type of action is conducive to the activity of shared playback as participants are not physically co-located and lack the ability to point or gesture to items on the movie display. To facilitate this, the present invention contemplates allowing participants to make non-destructive annotations to the movie as shown on each participant's display. This would be accomplished with additional events specific to this type of action as should be readily apparent to one skilled in the art. Annotations generally are shown in FIG. 4. A first annotation indicates "cool smoke effects" within the movie. A second annotation indicates a portion of the movie that needs to be highlighted. A third annotation indicates that a light needs to be moved to the right. This annotations are exemplary only, and other annotations are contemplated by the present invention.

The present invention further contemplates the use of video imaging. That is, a video image of one or more of the participants is transmitted over the communication channel 160 to the playback system of one or more of the other participants. The video image is then displaying in real-time on the playback system of the one or more other participants, thereby establishing a video conference among the participants concurrently with the synchronized playback of the movie.

It should be understood that embodiments of the present invention can be implemented in hardware, software or a combination thereof. In such embodiments, the various components and steps are implemented in hardware and/or software to perform the functions of the present invention. Any presently available or future developed computer software language and/or hardware components can be employed in such embodiments of the present invention.

Figure 2B:
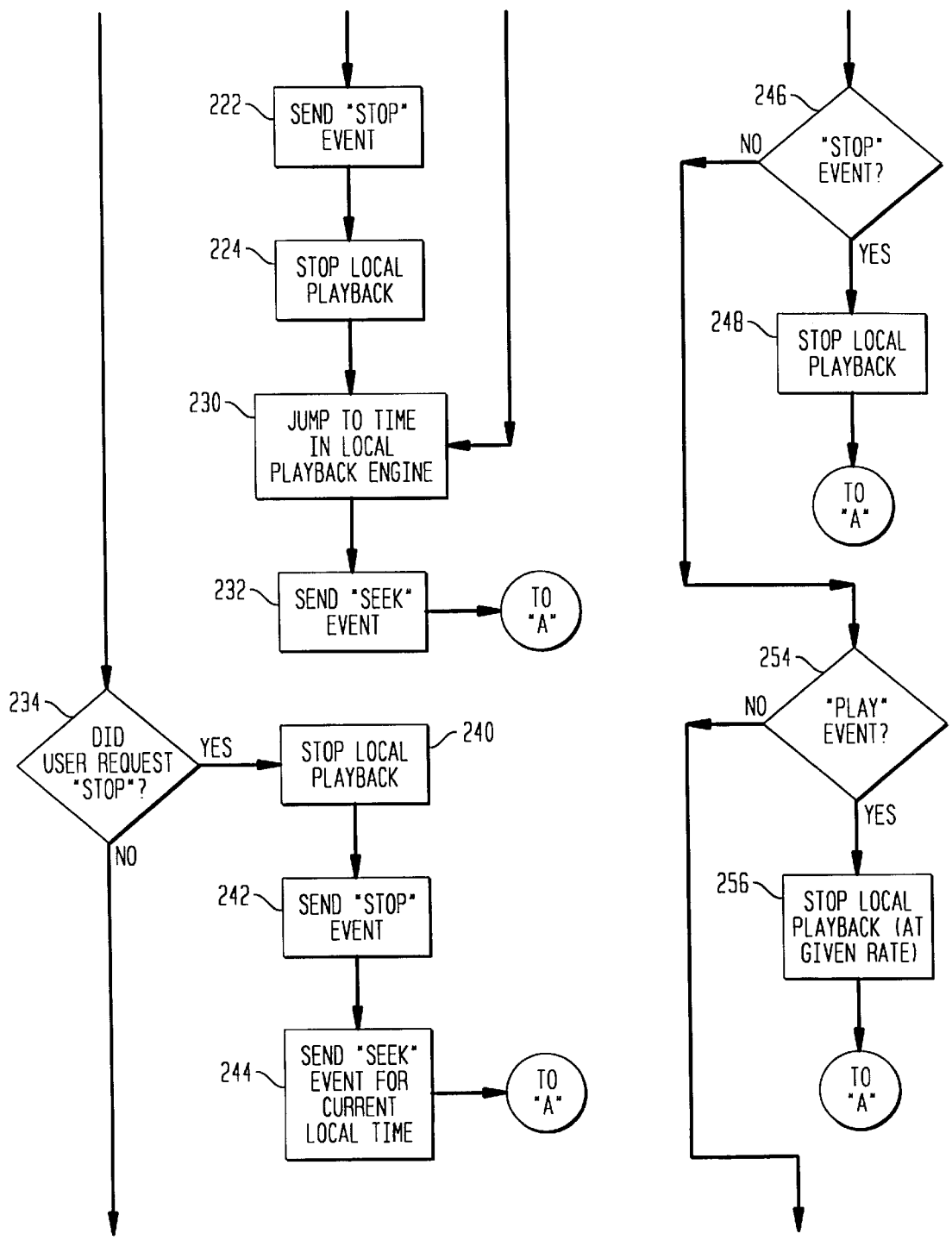
Figure 2C:
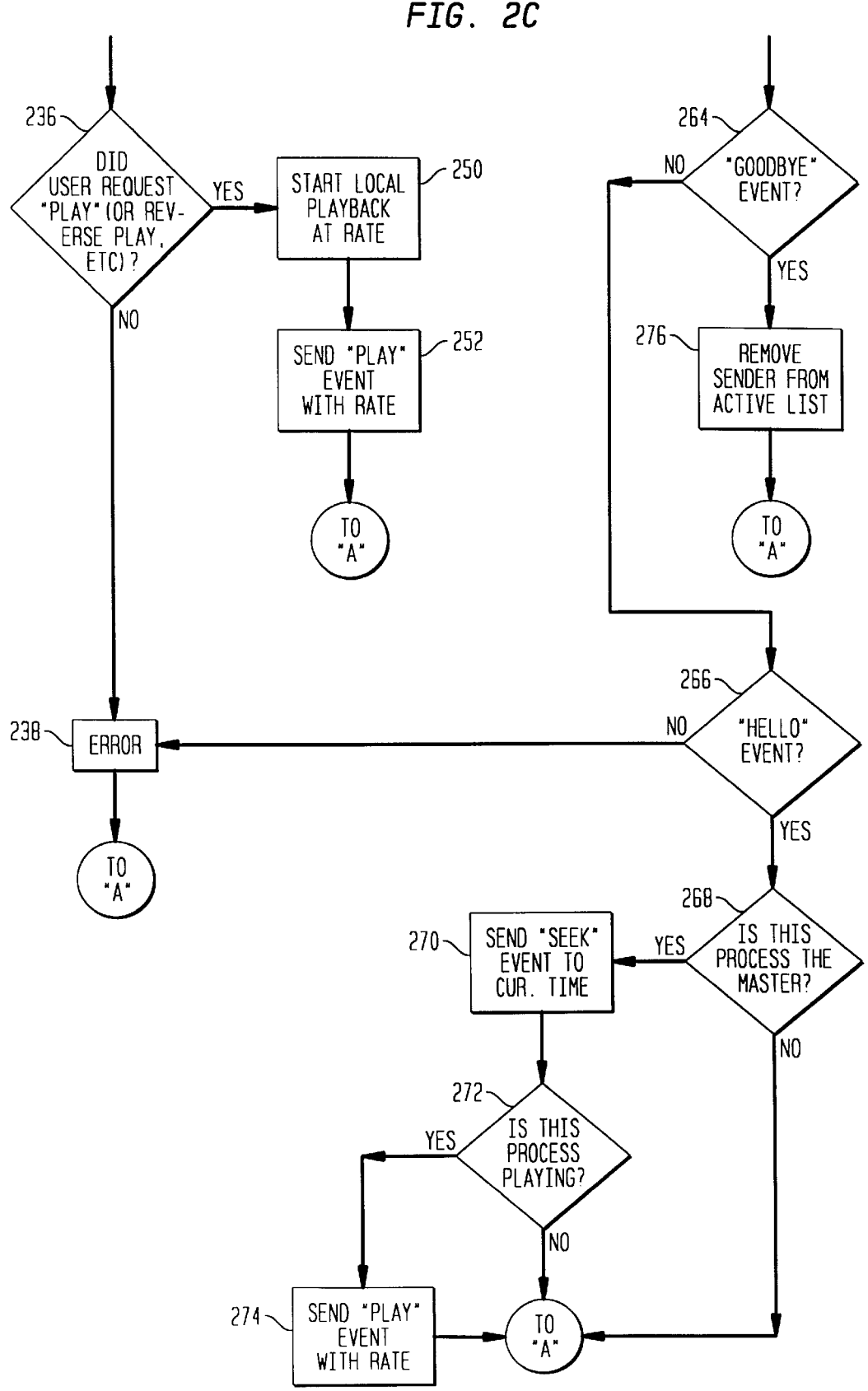

FIGS. 2A, 2B and 2C are flowcharts illustrating the actions of a participant participating in the synchronized viewing of a movie. A participant at a remote playback system wanting to join a synchronized playback session sends a hello event. This is shown in block 210. A master sends back a seek event and optionally a play event in response to the hello event. The "master" is the location that originally initiated the session or event. This step is shown in block 212. The seek event is required in order to advance the movie viewed by the participant at the remote system to the frame that all other participants are currently viewing. The play event is required if the movie is currently being played.

Each participant in a shared playback session is able to receive input from local graphical user interface 125, external transport controller 180, or event from another participant over the network asynchronously. That is, movie playback occurs even while receiving input from any of these sources. This is shown generally in block 214.

Block 216 is a decisional step that has two paths: a user event path and a network event path. Given participant 1 and participant 2, a user event is a local event generated by a participant I and received by the playback system used by participant 1. A network event is an event that is generated by participant 2 and received by the playback system of participant 1. In other words, a user event is local a network event is remote.

The user event path will be described first. Block 218 is a decisional step that determines whether the event is a seek event. If it is a seek event, flow progresses to block 220. Next it is determined whether the movie is playing or is stopped. If the movie is stopped, then the local playback system advances to the frame specified in the seek event, as shown in block 230, and a seek event is transferred to the remote playback systems by the local playback system. This last step is shown in block 232. Otherwise, a stop event is forwarded to all remote playback systems, as shown in block 222, and the movie is stopped as shown in block 224. Next, blocks 230 and 232 are processed, as described above. The process then returns back to block 214 where it continues to wait for a further event.

If the user event is not a seek event, the operational flow continues to decisional block 234. Decisional block 234 determines whether the event is a stop event. A stop event activates block 240 that stops local play of the movie. Next, the master sends a "stop" event to the other remote playback systems. This is shown in block 242. A seek event is sent by the participant initiating the event so that all movies at remote playback systems are synchronized. As discussed above, the present invention creates a virtual co-location. Thus, a stop event by itself may not guarantee that all remote locations are stopped at the same frame. Combining a seek event along with a stop event allows the present invention to maintain synchronization of each movie at each remote system. Flow then continues back to block 214.

If decisional block 234 determines that the event is not a stop event, flow continues to decisional block 236. Decisional block 236 determines whether the event is a play event. If it is not, block 238 indicates that there is an error. Otherwise, flow continues to block 250. Block 250 starts the local play at the indicated frame rate. As described above, the play event has associated therewith a desired rate at which a participant wants to play the movie. Next, a play event is forwarded to the other remote playback systems. This is shown in block 252. The process then flows back to block 214.

If decisional block 216 determines that the event is a network event, flow moves to decisional block 226. Decisional block 226 determines whether the event is a seek event. If the event is a seek event, block 228 advances the movie to the specified frame. Flow then continues back to block 214. If the event is not a seek event, flow continues to decisional block 246. Decisional block 246 determines whether the event is a stop event. Block 248 stops the movie if the event is a stop event as proceeds back to block 214. Otherwise, flow continues to decisional block 254.

Decisional block 254 determines whether the event is a play event. Flow continues to block 256 if the event is a play event. Block 256 starts the play of the movie at the specified frame rate. Flow then continues back to block 214. If the event is not a play event then flow continues to block 264. Block 264 determines whether the event was a goodbye event. A goodbye event triggers the removal of the sender from the active list of participants, as shown in block 276. Otherwise, block 266 determines whether the event is a hello event.

If block 266 determines that the event was not a hello event, an error is indicated, as shown in block 238. However, if the event was a hello event, flow continues to block 268. Block 268 determines whether the current process should respond to the hello event. In a preferred embodiment, the first participant is considered the "master" and therefore only the first participant responds to hello events. Otherwise, flow continues to block 270. Block 270 forwards a seek event to the participant that is joining the viewing session in order to synchronize the new participant with the other participants. Next, block 272 determines whether the movie is currently playing. If the movie is not playing, flow continues back to block 214. Otherwise, a play event is forwarded, along with the current play rate, to the new participant. Flow then continues back to block 214.

While the invention has been particularly shown and described with reference to preferred embodiments thereof, it will be understood by those skilled in the art that various changes in form and details may be made therein without departing from the spirit and scope of the invention.

What is claimed is:

1. A method for allowing a plurality of physically remote participants to individually control, in a collaborative manner, the viewing of movie data by the other participants, for use with a plurality of computer-controlled playback systems interconnected by a communication channel, each of the computer-controlled playback systems having means for transferring playback control data and means for storing the movie data, and each of the participants having access to at least one of the playback systems, the method comprising the steps of:

(1) interactively requesting, by any one of the participants, a playback function selected from a group including at least the following playback functions: play, stop and seek;

(2) transferring playback control data, corresponding to said requested playback function, onto said communication channel from a computer-controlled playback system accessible to said one of the participants requesting said playback function;

(3) receiving said playback control data, corresponding to said requested playback function, at the other computer-controlled playback systems; and (4) playing the movie data in a substantially synchronized manner at each of the playback systems in accordance with said playback control data as requested by said one of the participants.

2. The method of claim 1, further comprising the steps of: interactively specifying, by any of the participants, one or more annotations for one or more of the tracks in the movie; and displaying the annotations together with the annotated tracks in a synchronized manner on all of the computer-controlled playback systems.

3. The method of claim 1, wherein said playback function is selected from said group which further includes a fast forward play function, a slow forward play function, a reverse play function, and a slow reverse play function.

4. The method of claim 1, further comprising the steps of displaying a graphical user interface on each computer-controlled playback system, and requesting said playback function via said graphical user interface.

5. The method of claim 1 further including transferring over the communication channel said movie data to each one of the computer-controlled playback systems.

6. The method of claim 1, further comprising the steps of:
transmitting a real time video image of one or more of the participants to the computer-controlled playback system of one or more of the other participants; and
displaying said real-time video image on said computer-controlled playback system of said one or more of the other participants, thereby establishing a video conference among the participants concurrently with the synchronized playback of said movie data.

7. The method of step 1, further comprising the steps of transferring the movie data to each of the computer-controlled playback systems and storing the movie data in a media file, the media file being locally accessible to the computer controlled playback system.

8. The method of claim 1, wherein the step of transferring playback control data further includes the transfer of a sequence number.

9. The method of claim 1, further comprising the step of transferring a hello event, which allows one of the plurality of participants to join the viewing of said movie data subsequent to the transfer of at least one playback function.

10. A system for allowing a plurality of participants located at different locations to view and interactively control a movie, comprising:
(a) a communication channel; and
(b) two or more computer-implemented playback systems, connected via said communication channel, that allow the plurality of participants to view movie data, said movie data containing time-based tracks, each of said playback systems includes,
(i) a media playback engine that controls viewing of said movie data and transfers playback functions interactively requested by a participant to other participants over said communication channel, said playback functions include play, stop and seek,
(ii) a media file, connected to said media playback engine, that stores said movie data, and
(iii) a monitor, connected to said media playback engine, that displays said movie data.

11. The system of claim 10, wherein said communication channel is a local area network.

12. The system of claim 10, wherein said playback systems further include a modem and said communication channel is a telephone line.

13. The system of claim 10, wherein said time-based tracks include an image track and an audio track.

14. The system of claim 10, wherein said playback systems further include a graphical user interface, displayed on said monitor, that provides a window for displaying said movie data and a plurality of buttons that allow said participant to control said viewing of said movie data.

15. The system of claim 14, wherein said plurality of buttons include a copy button that allows said participant to copy a frame of said movie data from said window for further data processing including annotating said frame.

16. The system of claim 10, wherein said playback function includes an identification number, sequence number and information regarding the action requested by said participant.

17. The system of claim 10, further comprising means for transferring a video image of one of said participants over said communication channel for viewing by said other participants.

18. The system of claim of claim 10, further comprising an interlaced video display that is connected to said media playback engine, whereby one of said plurality of participants can compare the display of said interlaced video display with said monitor for differences.

19. The system of claim 10, wherein said movie data is stored within said media file in a compressed form, wherein the system further comprises means for decompressing said compressed form of said movie data.

20. The system of claim 10, wherein said playback system further comprises means for transferring a hello event, which allows one of said plurality of participants to join the viewing of said movie data subsequent to the transfer of at least one playback function.

21. The system of claim 10, wherein the transfer of said stop playback function also includes the transfer of said seek playback function, thereby allowing the synchronization of said movie data at each of said computer-implemented playback systems.

22. A method for allowing a plurality of physically remote participants to control, in a collaborative manner, the viewing of video data, for use with a plurality of computer-controlled playback systems interconnected by a communication channel, each of the computer-controlled playback systems having means for transferring playback control data and means for storing the video data, and each of the participants having access to at least one of the playback systems, the method comprising the steps of:
interactively requesting, by a first participant, a first playback function selected from a group including at least the following playback functions: play, stop and seek;
interactively requesting, by a second participant, a second playback function selected from said group;
transferring first playback control data, corresponding to said first playback function, onto the communication channel from a first computer controlled playback system accessible to said first participant;
receiving said first playback control data at a second computer-controlled playback system accessible to said second participant; and
transferring second playback control data, corresponding to said second playback function, onto said communication channel from said second computer controlled playback system accessible to said second participant;
receiving said second playback control data at said first computer-controlled playback system; and
playing the video data in a substantially synchronized manner at each of the playback systems in accordance with said first and second playback control data as requested by said first participant and said second participant.

23. The method of step 22, wherein said first computer-controlled playback system and said second computer-controlled playback system store the video data in a first local media file and a second local media file, respectively.

24. The method of claim 23, further comprising compressing the video data prior to the video data being stored in said first local media file and said second local media file.

25. The method of claim 22, further comprising the steps of interactively specifying, by either said first participant or said second participant, one or more annotations, which are associated with one or more tracks in the video data; and displaying the annotations together with said associated one or more tracks in a synchronized manner on said of first computer-controlled playback system and said second computer controlled playback system.

26. The method of claim 22, wherein said first playback function and said second playback function are selected from said group which further includes a fast forward play function, a slow forward play function, a reverse play function, and a slow reverse play function.

27. The method of claim 22, further comprising the steps of displaying a graphical user interface on said first computer-controlled playback system and said second computer-controlled playback system, and requesting said first playback function or said second playback function via said graphical user interface.

28. The method of claim 22, further comprising the steps of:

transmitting a first real-time video image of said first participant to said second computer-controlled playback system and a second real-time video image of said second participant to said first computer-controlled playback system; and displaying said first real-time video image on said second computer-controlled playback system and said second real-time video image on said first computer controlled playback system; thereby establishing a video conference among said first participant and said second participant concurrently with the synchronized playback of said video data.

29. The method of claim 22, wherein the step of transferring said first and playback control data and the step of transferring second playback control data further include the transfer of a sequence number.

30. A computer-controlled playback system for allowing a plurality of physically remote participants to individually control, in a collaborative manner, the viewing of movie data by the other participants, said computer-controlled playback system interconnected with a plurality of other computer-controlled playback systems by a communication channel, each of the computer-controlled playback systems having means for transferring playback control data and a local media file that stores the movie data, and each of the participants having access to at least one of the playback systems, the computer-controlled playback system comprising a local media file that stores the movie data;

means for enabling a participant to select a playback function from a group including at least the following playback functions: play, stop and seek;

means for transferring first playback control data, corresponding to said selected playback function, onto the communication channel to the other plurality of computer-controlled playback systems;

means for receiving second playback control data from the other plurality of computer-controlled playback systems; and means for playing the movie data in a substantially synchronized manner in accordance with said first and second playback control data.

31. The system of claim 30, wherein the computer-controlled playback system stores the movie data in a local media file.

32. The system of claim 31, further comprising means for compressing the movie data prior to the movie data being stored in said local media file.

33. The system of claim 30, further comprising means for enabling said participant to make one or more annotations, which are associated with one or more tracks in the movie data; and displaying said one or more annotations together with said associated one or more tracks in a synchronized manner on the plurality of computer-controlled playback systems.

34. The system of claim 30, wherein said playback function is selected from said group which further includes a fast forward play function, a slow forward play function, a reverse play function, and a slow reverse play function.

35. The system of claim 30, further comprising means for displaying a graphical user interface on at least one of the computer-controlled playback systems, wherein said participant requests said playback function via said graphical user interface.

36. The system of claim 30, further comprising means for transmitting a real time video image of one of the physically remote participants to the computer-controlled playback system of one or more of the other physically remote participants; wherein each of said computer-controlled playback systems include means for displaying said real-time video image, thereby establishing a video conference among the plurality of physically remote participants concurrently with the synchronized playback of the movie data.

37. The system of claim 30, wherein said first and said second playback control data include a sequence number.

38. The system of claim 30, wherein said seek playback function includes a time and a timescale.

39. The system of claim 38, wherein the movie data include time-based tracks; and wherein the transfer of said stop playback function via said first playback control data also includes the transfer of said seek playback function, thereby allowing the synchronization of the movie data at each of the plurality of computer-controlled playback systems.

* * * * *